(12) United States Patent
Arentsen

(10) Patent No.: US 12,372,265 B2
(45) Date of Patent: Jul. 29, 2025

(54) BUILDING COMPRISING AN AIR QUALITY CONTROL SYSTEM AND A SYSTEM AND METHOD FOR AIR QUALITY CONTROL

(71) Applicant: Vaventis B.V., Weesp (NL)

(72) Inventor: Johan Hendrik Adolf Arentsen, Lochem (NL)

(73) Assignee: VAVENTIS B.V., Enschede (NL)

( * ) Notice: Subject to any disclaimer, the term of this patent is extended or adjusted under 35 U.S.C. 154(b) by 466 days.

(21) Appl. No.: 16/979,221

(22) PCT Filed: Mar. 11, 2019

(86) PCT No.: PCT/NL2019/050155
§ 371 (c)(1),
(2) Date: Sep. 9, 2020

(87) PCT Pub. No.: WO2019/172768
PCT Pub. Date: Sep. 12, 2019

(65) Prior Publication Data
US 2020/0408434 A1     Dec. 31, 2020

(30) Foreign Application Priority Data

Mar. 9, 2018   (NL) ..................................... 2020565

(51) Int. Cl.
*F24F 11/77*     (2018.01)
*F24F 12/00*     (2006.01)
(Continued)

(52) U.S. Cl.
CPC .............. *F24F 11/77* (2018.01); *F24F 12/006* (2013.01); *F24F 2110/20* (2018.01); *F24F 2110/70* (2018.01); *F24F 2130/40* (2018.01)

(58) Field of Classification Search
CPC ...... F24F 11/77; F24F 12/006; F24F 2110/20; F24F 2110/70; F24F 2130/40
(Continued)

(56) References Cited

U.S. PATENT DOCUMENTS 2,440,803 A * 5/1948 Lea ........................... F28F 1/36
                                                    165/172
6,378,317 B1    4/2002 Ribo
(Continued)

FOREIGN PATENT DOCUMENTS

CN       106968973 A *  7/2017
EP        1752715 A1    2/2007
(Continued)

*Primary Examiner* — Allen R. B. Schult
(74) *Attorney, Agent, or Firm* — Hoffmann & Baron, LLP

(57) ABSTRACT

--Building including a living space, separated from an outside space by an outer wall, wherein a heat exchanger unit is provided at the outer wall and wherein a ventilator is provided for forcing air through the heat exchanger unit, wherein an air outlet duct is connected to the heat exchanger unit for allowing air to be expelled from the living space through the heat exchanger, such that heat can be exchanged in the heat exchanger between air flowing into the living space and air being expelled from the living space, wherein in the living space at least one sensor unit is provided for assessment of air quality and/or noise in the living space and control of the ventilator and/or the heat exchanger unit based on the assessed air quality and/or noise level in the living space.

24 Claims, 9 Drawing Sheets

(51) Int. Cl.
*F24F 110/70* (2018.01)
*F24F 130/40* (2018.01)
*F24F 110/20* (2018.01)

(58) Field of Classification Search
USPC ........................................................ 454/229
See application file for complete search history.

(56) References Cited

U.S. PATENT DOCUMENTS

| | | |
|---|---|---|
| 7,013,950 B2 | 3/2006 | Steneby et al. |
| 8,146,376 B1 * | 4/2012 | Williams ................. F24F 11/39 |
| | | 236/46 C |
| 2012/0324928 A1 * | 12/2012 | Durham ................... F24F 11/62 |
| | | 96/397 |
| 2017/0336094 A1 | 11/2017 | Kraus |
| 2017/0356670 A1 | 12/2017 | Zhang et al. |

FOREIGN PATENT DOCUMENTS

| | | | | |
|---|---|---|---|---|
| FR | 2957661 | | 9/2011 | |
| JP | 09210421 A | * | 8/1997 | |
| WO | WO-2015147728 A1 | * | 10/2015 | ................ F16L 7/00 |

* cited by examiner

BUILDING COMPRISING AN AIR QUALITY CONTROL SYSTEM AND A SYSTEM AND METHOD FOR AIR QUALITY CONTROL

This application claims priority from International Application No. PCT/NL2019/050155, filed on Mar. 11, 2019, which claims priority from The Netherlands patent application numbers NL 2020565, filed on Mar. 9, 2018, each of which is incorporated herein in its entirety.

TECHNICAL FIELD

The disclosure relates to a building comprising a system for control of living quality in at least one living space of the building. The disclosure further relates to a system for control of living quality in at least one living space of a building. The disclosure further relates to a method for control of living quality in at least one living space of a building.

DESCRIPTION OF THE PRIOR ART

It is becoming increasingly important that buildings such as houses, apartments, schools and offices are built energy efficient. One of the solutions to make buildings more energy efficient is by insulation of e.g. walls, floors, ceilings, roofs and windows. This reduces loss of energy for heating and/or cooling. A problem increasing insulation of buildings is however that this will limit ventilation of the living spaces of the building, which will have a negative effect on air quality in the building.

In order to limit the problems with ventilation in buildings, especially insulated buildings, it has been proposed to provide for mechanical ventilation in the building. This means however that air heated in the building is expelled from the building, which is replaced by colder outside air, which then has to be heated again in the building, increasing heating energy and cost. Similarly, if the outside air is warmer than the desired inside air temperature cooled air will be expelled and replaced by warmer outside air, which then has to be cooled in the building, increasing energy consumption and cost again.

In order to overcome such energy loss it has been proposed to incorporate a heat exchanger in the system. For example by providing a building comprising at least one living space, separated from an outside space by at least one outer wall, wherein at least one heat exchanger unit is provided at said outer wall. At least one ventilator may be provided for said heat exchanger unit, for forcing air through the heat exchanger. An air outlet duct is connected to the heat exchanger for allowing air to be expelled from the at least one living space through the heat exchanger, such that heat can be exchanged in the heat exchanger between air flowing into the at least one living space and air being expelled from said at least one living space. In such known systems a central heat exchanger unit is provided for a building, connected to at least a series of air outlet ducts connected to air extraction openings in the various living spaces in the building. From each of these living spaces air is extracted and forced through the heat exchanger to be expelled to the outside air, whereas at the same time air is sucked into the building through the heat exchanger. Heat is exchanged between the two air flows, for recuperating energy.

It has been found that these system are not optimal. In such systems the volume of air extracted from a living space may be the same for all circumstances, or can be regulated based on a temperature sensed by a thermostat in one of the living spaces or based on a temperature difference between inside such living space and an outside temperature. Moreover, for all living spaces in the building air exchange may be controlled by a central control unit. Furthermore such central heat exchanger units have to be placed relatively far away from the relevant living spaces.

SUMMARY OF THE INVENTION

An aim of the present disclosure is to provide for an alternative system and building comprising a system for control of living quality in one or more living spaces in such building. An aim of the present disclosure is to provide for an alternative method for control of living quality in a building. An aim is to provide for a method and system with which living quality can be monitored and controlled accurately. An aim of the disclosure is to provide for an energy friendly building in which living quality can be controlled accurately, preferably in different living spaces in the building. At least one of these and/or other aims and effects of the present disclosure can at least in part be obtained by a building, a system and/or a method according to the disclosure.

In an aspect a building according to the disclosure can be characterized by at least one living space, separated from an outside space by at least one outer wall, wherein at least one heat exchanger unit is provided at said outer wall and wherein at least one ventilator is provided for said heat exchanger unit, for forcing air through the heat exchanger. An air outlet duct can be connected to the heat exchanger for allowing air to be expelled from the at least one living space through the heat exchanger, such that heat can be exchanged in the heat exchanger between air flowing into the at least one living space and air being expelled from said at least one living space. According to the disclosure in said at least one living space at least one sensor unit can be provided for assessment of air quality and/or noise in said at least one living space and control of the at least one ventilator and/or the at least one heat exchanger unit based on the assessed air quality and/or noise level in said living space.

In an aspect the disclosure can further be characterized in that at least two living spaces and/or groups of living spaces are provided in said building, separated from each other by walls, floors and/or ceilings. At least one door can be provided between said two living spaces or groups of living spaces. Each of the two living spaces or groups of living spaces is provided with at least one heat exchanger at an outside wall and at least one ventilator for said at least one heat exchanger. Furthermore each of the two living spaces or groups of living spaces is provided with at least one sensor unit for controlling the relevant heat exchanger and/or ventilator based on air quality and/or noise in the relevant living space or group of living spaces.

In such system in different areas of the building living quality can be monitored and controlled substantially independently. Moreover the living quality can be controlled based on for example $CO_2$, air humidity, small particle content and/or noise in the living space in which living quality is to be controlled. Preferably in each sensor unit values can be set for $CO_2$ level, humidity, small particles and/or noise, such as for example upper limits and/or lower limits and/or preferred values, for $CO_2$, humidity, small particle content and/or noise.

In preferred embodiments the building comprises at least one group of living spaces, comprising at least a first and a second living space, separated from each other by an internal wall. In said internal wall at least one air forwarding unit is provided, preferably comprising at least one ventilator and/or one valve, for allowing passing of air from the first living space to the second living space. Preferably a sensor unit is provided in or connected to the air forwarding unit, for controlling the air forwarding unit at least on the bases of air quality assessed by at least the sensor unit. In embodiments the first living space can be provided with the outside wall comprising at least the heat exchanger and the at least ventilator, for introducing outside air into the first living space. In such system when necessary air can be forwarded from a first living space into a second living space, based on inter alia air quality in the second living space. Air can also be removed from the said first living space through or passed the heat exchanger, for example to the environment of the building.

In embodiments a cascade of living spaces can be formed, connected by forwarding units, such that an air flow can be provided through the subsequent living spaces, introducing outside air into a first living space through a heat exchanger and expelling at least part of the air from the last of the living spaces in the cascade, for example fed through the same heat exchanger. In each of the individual living spaces then living quality, especially but not only air quality can be controlled, wherein for different living spaces different qualities can be defined to which it is controlled. For example for wet rooms a higher upper level for humidity can be set then for an adjoining bed room or living room. Preferably in such cascade of living spaces if a wet room is included such wet room will be one of the last, more preferably the last in the series, such that an inlet opening of an outlet duct is provided in said wet room.

In embodiments the building can have a first outer wall on a first side of the building, comprising a first heat exchanger connected to an outlet end of a first air outlet duct and a second outer wall on a second side of the building, comprising a second heat exchanger connected to an outlet end of a second air outlet duct. Inlet openings of the first and second air outlet ducts are then provided in different living spaces. In such embodiments in different areas different living qualities can be controlled, substantially independently, for example one for a living room or a living room and a kitchen, and one for bed rooms, wet rooms and for example a hallway.

In embodiments near each heat exchanger in an outer wall the at least one ventilator is provided at an outside facing area of the heat exchanger. By placing the ventilator at an outside facing side of the heat exchanger, preferably at an outside of the building, will effectively aid in noise reduction.

In embodiments the building can be a house or an apartment or the like. In embodiments the building or at least the living space can be a class room or office space. In embodiments a series of heat exchangers is provided at the outer wall, wherein at least one ventilator is provided for initiating an air flow through the heat exchangers, from an outside of the outside wall into the building, such as into a class room or office space and/or at least one ventilator for initiating an air flow through the heat exchangers, from the building, for example from a class room or office space, to an outside of the outside wall.

In all embodiments the at least one heat exchanger can comprise a core and wire wound around said core, the wire being heat conductive, preferably metal wire, more preferably copper based wire. Air flows in substantially parallel but opposite directions can be fed through such heat exchanger with high efficiency in heat exchange, relatively low resistance in flow, compact in design and relatively cost effective in production and use.

The present disclosure moreover relates to a living quality control system for a building, preferably regulating at least air quality, comprising at least a first heat exchanger unit, a first ventilator unit and a first sensor unit, connected to at least the first ventilator, preferably the first ventilator and the first heat exchanger. The system can further comprise at least a second heat exchanger unit, a second ventilator unit and a second sensor unit, connected to at least the second ventilator, preferably the second ventilator and the second heat exchanger. Each sensor unit can comprise at least a $CO_2$ sensor and a humidity sensor and a control unit for control of the ventilator and/or the heat exchanger coupled thereto. Moreover at least one particle sensor can be coupled to the control unit.

The present disclosure further relates to a method for control of living quality in a building, wherein a ventilator and/or a heat exchanger mounted at a wall of a living space are controlled by at least a sensor unit provided in a living space inside the building. The sensor unit comprises and/or is connected to at least a $CO_2$ sensor and a humidity sensor in at least one living space of the building. The sensor unit comprises a control unit for controlling at least the said ventilator based on signals from said sensors, wherein at least the ventilator is controlled based on a $CO_2$ level and the humidity level in said living space. Mounted at a wall should be understood as meaning that at least an air intake and/or an air outlet of the system is provided in or at a wall, such as an outer wall of said building.

Control of the ventilator for ventilation based on at least $CO_2$ levels and humidity of the air inside the living space in the building provides for a surprisingly practical method for living quality control, especially at least air quality control in at least one living space in a building. Ventilation can for example easily be adapted to a change in for example a number of people in a living space. More people will exhale more $CO_2$, which in a method of the present disclosure may lead to control of the at least one ventilator for increasing the volume of air going into and/or out of the living space, which may be referred to as increasing the ventilation rate for the living space. When fewer people are present in such living space, or people are less active in such living space the ventilation rate may be decreased, reducing the volume of air going into and/or out of the living space. This may also reduce the noise generated by the ventilation system, especially the ventilator.

In further elaboration of a method for control of living quality additionally or alternatively to the $CO_2$ sensor and/or the humidity sensor a noise sensor can be connected to the sensor unit, which for example controls the ventilator based on noise level in said living space, such that a rotational speed of the ventilator is reduced and/or for example a bypass may be used and/or a second heat exchanger having a lower flow resistance can be used when noise generated in the living space is reduced. In embodiments a maximum noise level may be set in the sensor unit and resistance over the heat exchanger may be reduced when the $CO_2$ level in the living space exceeds a predetermined upper limit and/or the humidity level exceeds a predetermined maximum level, and the noise in the living space is at or close to a predetermined maximum level.

In further elaboration of a method for control of living quality additionally or alternatively to the $CO_2$ sensor and/or the humidity sensor and/or a noise sensor at least one small particle sensor can be connected to the sensor unit, which for example controls the ventilator based on small particle levels in said living space and/or outside said living space. For example a rotational speed of the ventilator can be amended with increasing or decreasing values of small particles sensed in the living space and/or outside the living space. In embodiments a maximum small particle level may be set in the sensor unit and resistance over the heat exchanger may be reduced when the $CO_2$ level in the living space exceeds a predetermined upper limit.

In embodiments the control unit can comprise a processing unit provided with an algorithm for optimizing living quality, for example air quality and noise in a living space, such that the $CO_2$ level, humidity and/or small particle concentrations in the living space are controlled at or at least relatively close to a predetermined optimum level or within a predetermined optimum range, wherein the noise level is preferably minimized or at least controlled below a predetermined maximum noise level.

In embodiments in a method of the disclosure a further $CO_2$ sensor and/or a further humidity sensor and/or a further small particle sensor are provided, for controlling a forwarding unit in an internal wall in the building, connecting the living space with a further living space. The further $CO_2$ sensor and/or humidity sensor and/or the further can be connected to a further sensor unit and/or to the same sensor unit.

By control of the forwarding unit a flow of air can be controlled from the one living space into the further living space. The forwarding unit can comprise a ventilator and/or a valve system for control of air flow between the living spaces. The forwarding unit can comprise a further heat exchanger.

In such method living quality, especially air quality and noise can be controlled in a series of interconnected living spaces, by forwarding air from one of the living spaces into a next one in the series, whereas the air can be expelled from the building for example from the last one of the living spaces in the series, for example through an outlet duct forwarding air from said last one of the living spaces through the heat exchanger in the outside wall of the first living space in the series of living spaces.

A method of the disclosure can comprise the steps of:
  in a first living space or a first series of living spaces air quality, especially at least $CO_2$ level, small particle matter and/or humidity, is controlled by a first sensor unit or a series of sensor units, such that air is circulated through the first living space or first series of living spaces, entering and exiting the building at least in part through the at least one heat exchanger provided at an outer wall of said first living space or one of the living spaces in said first series of living spaces; and
  in a second series of living spaces air quality, especially at least $CO_2$ level, small particle matter and/or humidity, is controlled by a second sensor unit or a series of sensor units, such that air is circulated through the second series of living spaces, entering and exiting the building at least in part through the at least one heat exchanger provided at an outer wall of one of the living spaces in said second series of living spaces;
  wherein preferably air flow through the first living space or series of living spaces is substantially separated from air flow through the second series of living spaces.

In such method for example a first series of living spaces can comprise a living room and a kitchen, whereas a second series of living spaces can comprise one or more bedrooms and a bathroom and/or shower. Obviously more than one series of living spaces can be provided in the same building.

With such method of the disclosure air quality can be controlled in the living spaces of the different series substantially independently.

Preferably in the or each series the last living space in the series is a living space in which the highest air humidity is acceptable, such as a kitchen, shower or bathroom.

BRIEF DESCRIPTION OF THE DRAWINGS

In further elucidation of the present invention embodiments of the present disclosure, such as embodiments of buildings, methods and systems shall be described hereafter, with reference to the drawings. Herein shows schematically.

DETAILED DESCRIPTION OF THE INVENTION

Figure 1:
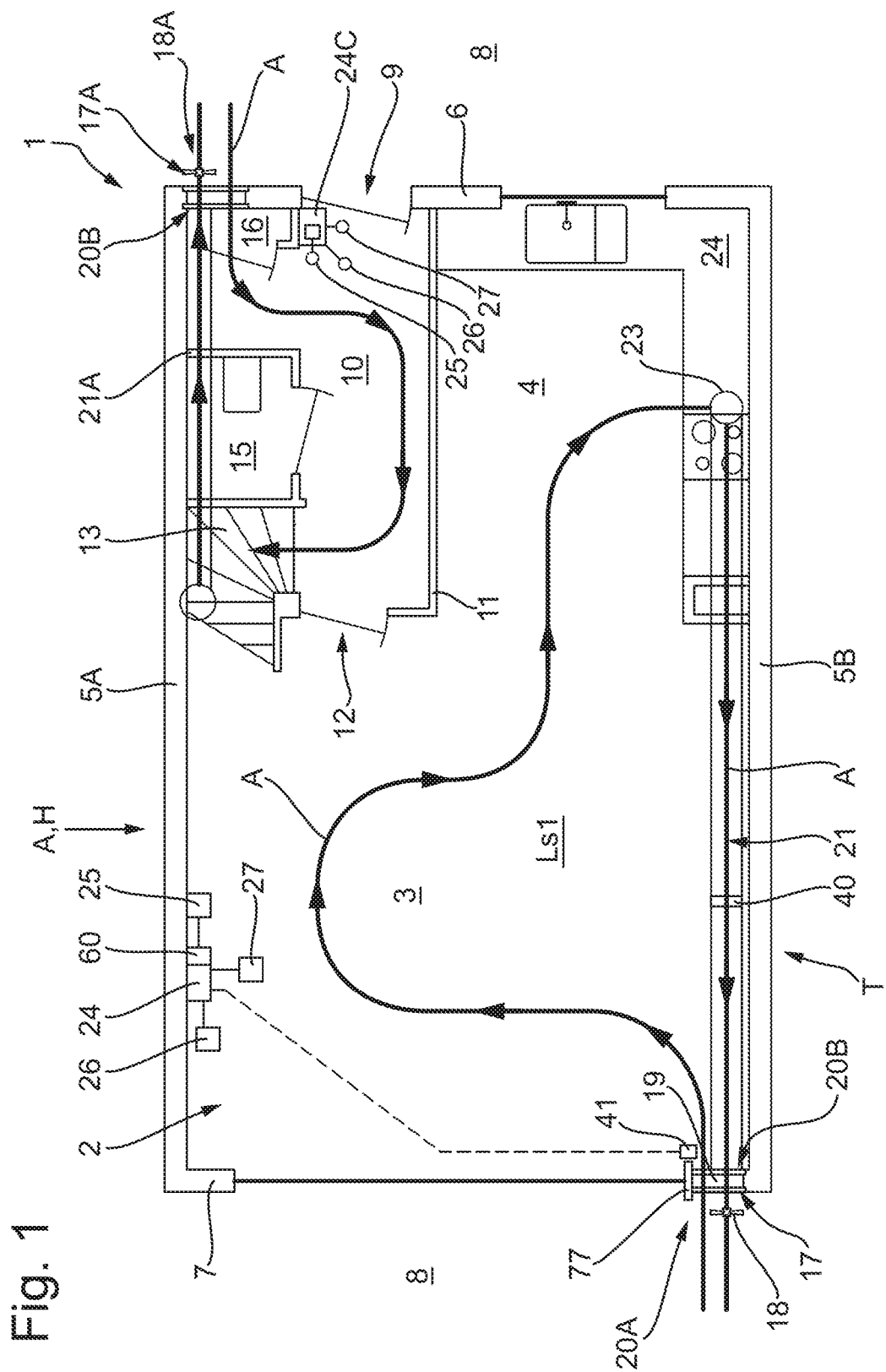
FIG. 1 a floor plan of a ground floor of a house according to the disclosure, as a building or part of a building.

In this description embodiments of the invention will be described with reference to the drawings by way of example only. These embodiments should by no means be understood as limiting the scope of the disclosure. At least all combinations of elements and features of the embodiments shown are also considered to have been disclosed herein. In this description the same or similar elements and features will be referred to by the same or similar reference signs.

In this description expressions of orientation such as top, bottom, vertical etcetera are used for convenience only and refer to the orientation of a building in a normal, horizontal position as seen in the accompanying drawings. Such expressions are not to be regarded as limiting the orientation of elements of the system in use.

In this description a living space should be understood as at least meaning but is not limited to a room in a building, such as but not limited to living rooms, studies, dens, bedrooms, bathrooms, showers, toilets, halls and hallways and the like. In this disclosure living quality has to be understood as meaning at least the environmental quality experienced by users of a living space, such as but not limited to air quality, for example but not limited to air $CO_2$ content, air temperature, air particle content and relative humidity of air, noise in a living space, air flow or draft and other factors potentially influencing a persons health and well being in a living space.

In this disclosure a building has to be understood as at least meaning, but not limited to a structure built using building materials like brick, concrete, wood, metal, plastics and the like, comprising at least one and preferably multiple living spaces. A building can for example be or comprise a single house or an apartment. In this disclosure a house has to be understood as at least meaning but not limited to a building having as a main function housing for example a person or family as living quarters, that functions as a home, ranging from simple dwellings to complex, fixed structures of wood, brick, concrete or other materials containing plumbing, ventilation and electrical systems designed. A house can have its own front door opening the house to an outside space such as a public street, garden, driveway or the like. In this disclosure an apartment has to be understood as meaning at least but not limited to a home having provisions substantially like a house but having a front door opening into a space or area shared by several such apartments, said shared space or area having a front door opening the said space or area and thus the apartments to an outside space such as a public street, garden, driveway or the like. Houses and apartments can have their own heating system or several houses and/or apartments can have combined heating systems, such as block heating.

In this disclosure an outside wall has to be understood as a wall separating a living space in a building with a space outside the building, which space is preferably an outside environment comprising open air, which can also be referred to as outside air, or an area other than a living space, which is in open connection with an outside environment comprising open air, such as for example an atrium, for example an atrium into which front doors of one or more houses and/or apartments open.

In this disclosure living quality such as air quality can be defined inter alia by at least $CO_2$ content in the air, small particles in the air and air humidity, more specifically relative humidity in said air. In the present disclosure the system and methods can be designed for control of the thermal indoor conditions and especially air quality in the living spaces according to ANSI/ASHRAE Standard 55, as published in 2017, for example according to an Adaptive Model as defined therein, wherein preferably in living spaces for homes, such as houses or apartments $CO_2$ levels are controlled below about 1000 ppmV and for class rooms and offices $CO_2$ levels are controlled at least below about 5000 ppmV, preferably below 2000 ppmV, when occupied by humans, whereas relative humidity in living spaces, especially living spaces not being wet rooms is controlled preferably between about 20 and 80%, for example between 30 and 70%, such as for example between 40 and 60%.

In this disclosure humidity in air has to be understood as relative humidity (RH %). Relative humidity is a well known factor and can be defined for example as the ratio of the partial pressure of water vapor to the equilibrium vapor pressure of water at a given temperature, and is expressed as a percentage. Relative humidity depends on temperature and the pressure of the system of interest. It requires less water vapor to attain high relative humidity at low temperature, more water vapor is required to attain high relative humidity in warm or hot air.

In this disclosure $CO_2$ levels have to be understood as the amount of $CO_2$ gas in a living space, in parts per million in Volume (ppmV).

In the present disclosure a class room or office space has to be understood as at least meaning but not limited to a space in a building designed to be occupied during at least part of a day by a group of people, which is not a home.

In this disclosure small particle sensors can be provided for sensing and preferably registering small particles contained in air. Preferably such sensors can at least be used for registering small particles and small particle distribution in air, as well as the amount of such small particles in a volume of air. Such small particle sensors can for example be optical sensors, such as laser based sensors. Small particles should be understood at least as for example in accordance with definitions provided in ISO16890, such as coarse particles, particles of 10 µm or less, particles of 2.5 µm or less and/or 1 µm or less.

In this disclosure air filter units can be provided, for filtering small particles from an air flow. Such filters can for example be in accordance with ISO16890, class PM10 or finer, preferably PM2.5 or finer, for example PM1. An air filter unit may comprise one or more filters, for example at least a PM1—70% filter, filtering out (when new) about 70% of all particles of 0.4 µm or more. Preferably in a filter unit of the disclosure a combination is used of at least one filter, for example at least one PM1 filter, and at least one small particle sensor, coupled to a control unit for controlling air flow and/or ventilation characteristics based on at least registered small particles in an air flow through said filter.

In embodiments of the disclosure a building is provided having multiple living spaces such as rooms, wherein for different living spaces living quality, especially air quality and noise is controlled, preferably substantially independently. In embodiments of the disclosure relatively compact units can be used, both as heat exchanger and as forwarding unit, which can have the advantage that noise levels can be kept to a minimum. Moreover no ducts or at least only a very limited number of ducts will be necessary for a system of the disclosure, minimizing constructional consequences for the building. This makes a system of the disclosure especially also suitable for use when refurnishing buildings as well as in new builds.

In embodiments of the disclosure heat exchangers and/or forwarding units can be used of which air resistance can be amended, for example by using valves, and/or ventilator speed can be adapted, again allowing for optimizing, i.e. minimizing noise and increasing efficiency. Preferably for each heat exchanger and/or forwarding unit a separate control device or unit is provided, such that for each heat exchanger and/or forwarding unit individually an optimal setting can be controlled.

FIG. 1 discloses a floor plan of part of a building 1, here shown as a floor plan of a ground floor 2 of a house H or of an apartment A. The floor plan shows at least one living space Ls1, here shown as a living room 3 with an open plan kitchen 4 incorporated therein or at least connected thereto. The living space Ls1, which can also be referred to as a first living space, is defined by at least a first and second side wall 5A, 5B and a front wall 6 and a rear wall 7. In this embodiment at least the rear wall 7 is an outer wall, separating the living space Ls1 from an outside space 8. Said outside space is preferably open air. In this embodiment in the front wall 6 a front door 9 is provided, opening the house or apartment to the outside space 8 or for example an atrium. The front door 9 opens into a hall 10 of the house, separated from the living space Ls1 by a separating wall 11 comprising a room door 12. In the hall 10 for example a stair case 13 may be provided, leading to a first floor 14 (see e.g. FIG. 2). Moreover in the hall 10 for example a toilet space 15 can be provided, as well as a utility cupboard 16 housing for example a fuse box, gas and water meters and the like. The side walls 5A, 5B may be outer walls or separating walls, separating the house from one or more adjacent buildings such as adjoining houses or apartments.

In this embodiment at least one heat exchanger unit 17 is provided at the rear wall 7, especially at least partly in said wall 7. At least one ventilator 18 is provided for said heat exchanger unit 17, for forcing air through a heat exchanger 19 in said heat exchanger unit 17. The at least one ventilator 18 can be provided in said heat exchanger unit 17 or can be provided separated therefrom, and can for example be provided at an outside facing side 20A thereof, i.e. at a side facing the outside space 8, or at the opposite inward facing side 20B of the heat exchanger unit 17. An air outlet duct 21 is connected to the heat exchanger unit 17 for allowing air to be expelled from the at least one living space Ls1 through a heat exchanger 22 of the heat exchanger unit 17, such that heat can be exchanged in the heat exchanger between air flowing into the at least one living space Ls1 from the outside space 8 and air being expelled from said at least one living space Ls1 through the outlet duct 21.

In the embodiment shown in FIG. 1 an inlet end 23 of the outlet duct 21 is provided spaced apart from the heat exchanger unit 17. In this embodiment the inlet end 23 is shown above a kitchen top 24 provided in the kitchen 4, for example above a stove. More general the inlet end 23 of the outlet duct may preferably be provided in or near an area in the living space Ls1 where the highest RH may be expected and/or for example be used as a kitchen hood. In embodiment the or a ventilator 18 may be provided in said outlet duct 21, for example at or near the inlet end 23 or at or near the heat exchanger unit 17.

In the first living space Ls1 a sensor unit 24 is provided for assessment of air quality and/or noise in said first living space Ls1. The sensor unit 24 is connected to or provided with at least a $CO_2$ sensor 25 for sensing a $CO_2$ level in the air in the living space Ls1, in ppmV, and/or a humidity sensor 26 for sensing relative humidity RH in the living space Ls1. Moreover a noise sensor 27 such as a microphone may be provided in or connected to the sensor unit 24. Connected in this disclosure should be understood as meaning connected by wire or wireless, for example by any suitable wireless protocol, such as over Bluetooth®, Wi-Fi, ZigBee, telephone protocol, infra red or the like, for transmitting data from any one of the sensors 25-27 to the sensor unit 24 and/or exchanging information and control data between the sensor unit and for example the heat exchanger unit 17 and/or the at least one ventilator 18.

The sensor unit 24 comprises or is connected to a control unit 60 and is designed for control of the at least one ventilator 18 and/or the at least one heat exchanger unit 17 based on assessed air quality and/or noise level in said living space Ls1, for providing for air flow through one or more living spaces. In the drawings air flow is shown by arrows A. In FIG. 1 the air flow A is shown passing from outside space 8 through the heat exchanger unit 17 into the living space Ls1 and out through the heat exchanger unit 17. The air flow A passes through the living room 3 and kitchen 4 before entering into the outlet duct 21 through the inlet 23.

It should be noted that one or more bypasses 77 can be provided in or passing by the heat exchanger unit 17, such that for example outside air can be entered into a living space or removed from a living space, or can pass from one living space to another without passing through the relevant heat exchanger unit 17. This can be advantageous for example in order to obtain a larger air flow without increasing noise by a ventilator or noise of air flowing through the heat exchanger unit 17. Preferably the or each bypass 77 is provided with for example a valve or valve system and/or a ventilator or ventilator unit, for example as described herein, such that air flow through each bypass can be regulated, preferably by a regulating or control unit 60 or sensor unit 24 in a living space.

In the embodiment of FIG. 1 a further, second heat exchanger unit 17A is provided in the front wall 6. Again, a ventilator 18A is provided for the second heat exchanger unit 17A. An inside facing side 20B of the second heat exchanger unit 17A may for example open into the utility cup board 16 or directly into the hall 10. A second outlet duct 21A may be provided, having an outlet end connected to the second heat exchanger unit 17A and extending to a first floor 14, as shown in FIG. 2.

Figure 2:
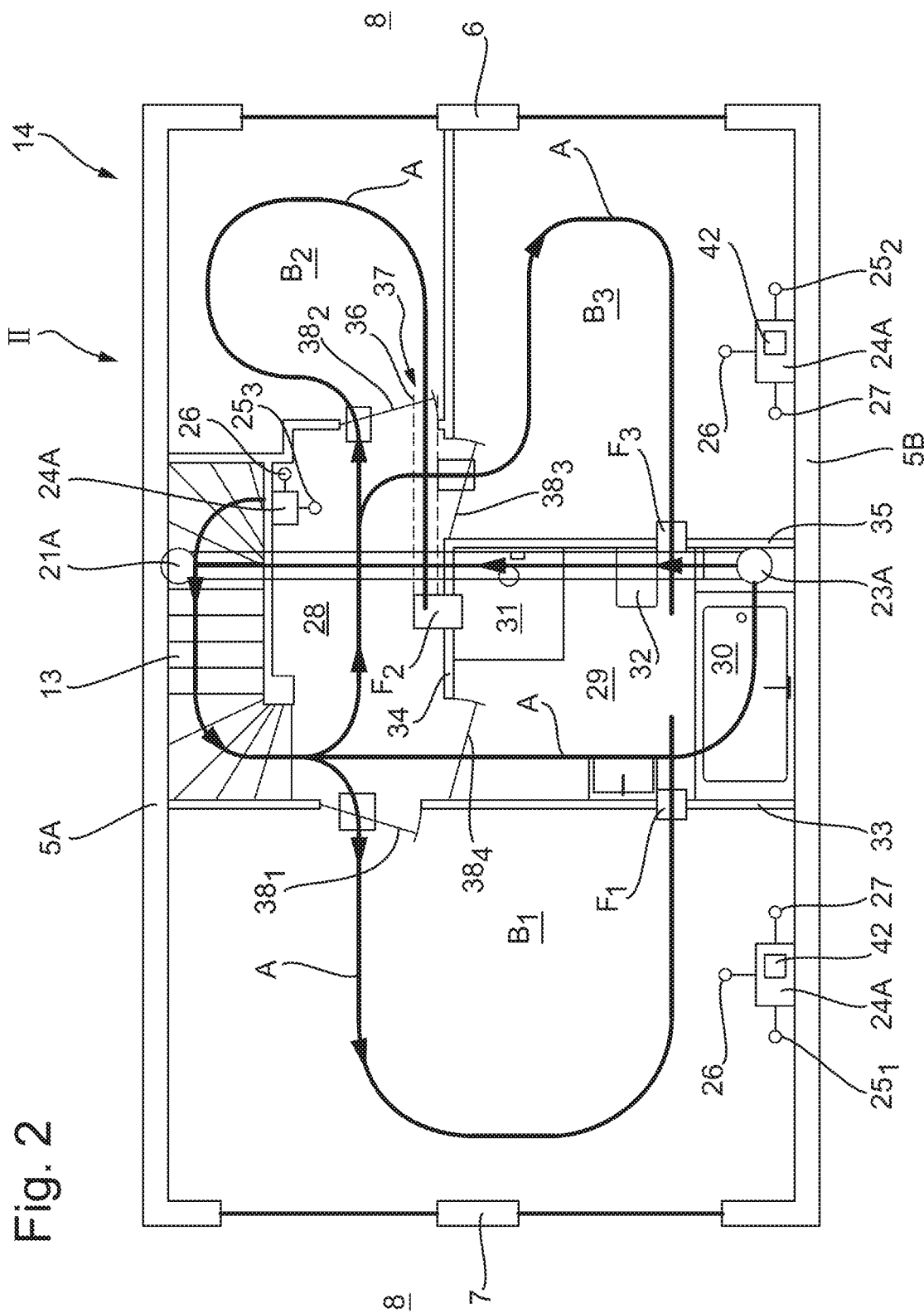
FIG. 2 a floor plan of a first floor of the house according to FIG. 1.

FIG. 2 shows a floor plan of a first floor 14, by way of example only, having three bedrooms B1, B2 and B3, as living spaces, all opening into a central passage 28 into which also the stair case 13 opens. The first bedroom B1 in this embodiment is located at a rear side of the house, the second and third bedrooms B2, B3 side by side at a front side of the house H. Between the first and third bedroom B1, B3, a bathroom or "wet cell" 29 is provided, again opening into the central passage 28. In this embodiment, by way of example, the bathroom 29 discloses a bath 30, sink 31 and toilet 32. In this embodiment an inlet end 23A of the second outlet duct 21A is provided in an upper corner of the bathroom or wet cell 29, above the bath 30. Hence air can be extracted from the wet cell or bathroom 29 through the second outlet duct 29 to and through the second heat exchanger unit 17A.

In this embodiment in a first separating wall 33, between the first bedroom B1 and the bathroom 29 a first forwarding unit F1 is provided, in a second separating wall 34, between the hall 28 and the bathroom 29 a second forwarding unit F2 is provided and in a third separating wall 35, between the third bedroom B3 and the bathroom 29 a third forwarding unit F3 is provided. The second bedroom B2 can be connected to the second forwarding unit F2 through the central passage 28 or for example through a connecting duct 36 having an inlet opening 37 in the second bedroom B2, for example above a door 38 opening into the passage 28.

A forwarding unit F in this disclosure is a unit for allowing controlled passage of air from one space to another through at least one wall, especially from a space at a first side of a separating wall into a space at an opposite second side of the separating wall or a space further apart, through a connecting duct. A forwarding unit F, as for example shown in FIG. 5, can comprise at least one ventilator 18. A forwarding unit F can be connected to a sensor unit 24A, for example a sensor unit similar to the sensor unit 24 discussed in relation to FIG. 1. In the embodiment shown for each of the bedrooms B1, B2 and B3 a sensor unit 24A is provided. Each of the bedrooms B1, B2, B3 is moreover provided with at least a $CO_2$ sensor $25_1$, $25_2$, $25_3$, connected to the relevant sensor unit 24A. Obviously two or more of the sensor units 24, 24A can be combined into a single sensor unit 24A, controlling the relevant forwarding unit F1, F2, F3 based on at least data from the relevant sensor $25_1$, $25_2$, $25_3$. As discussed in relation to FIG. 1 furthermore at least one and preferably all of the bedrooms B1, B2 and B3 can be provided with a humidity sensor 26 and/or a noise sensor 27, connected to the relevant control unit 24, 24A for further control of the relevant forwarding unit(s) F1, F2, F3. Moreover a further sensor unit 24C can be connected to the second heat exchanger unit 17A. The sensor unit 24C can for example comprise sensors 25C, 26C and/or 27C in the hall 10 and/or central passage 28, or can be controlled based on data received from one or more of the sensor units 24A.

In this embodiment air A can flow from the outside space 8 through the second heat exchanger unit 17A up the stair case 13 into the central passage 28. From the central passage 28 air can flow into the bedrooms B1, B2 and B3, and into the bathroom 29, for example passing below doors $38_1$, $38_2$, $38_3$ and $38_4$ opening the central passage 28 into the first, second and third bedrooms B1, B2 and B3 and the bathroom 29 respectively. Obviously also other provisions can be provided for allowing air to flow from the central passage 28 into the adjoining living spaces B1, B2, B3 and 29, preferably passively, for example an opening in a relevant separating wall.

From each of the bedrooms B1, B2, B3 air can be passed into the bathroom or wet cell 29 through the relevant forwarding unit F1, F2, F3, controlled by the relevant control unit 24A and based on data provided by the relevant sensor or sensors 25, 26 and/or 27 provided in the respective bedrooms B1, B2 and B3.

As can be understood from FIGS. 1 and 2, at least two living spaces are provided in the building 1, in which for each air quality can be controlled individually through a control unit 24, 24A. In embodiments in a building 1 there can be multiple groups of living spaces. In the embodiment shown there are two groups of living spaces. The first group I comprises the living room 3 and kitchen 4, whereas the second group II comprises the hall 10 and toilet space 15, the staircase 13 with central passage 28, the bedrooms B1, B2 and B3 and the bathroom 29. In this embodiment the groups I and II are connected through the door 12. Nevertheless air quality can be controlled substantially individually for the living spaces in the groups I, II. Energy, especially heat can be retrieved from air circulated in the first group I through the heat exchanger unit 17 in the rear wall 7, whereas it can be retrieved from the air circulating in the second group II by the second heat exchanger unit 17A, thus allowing for optimizing energy control as well.

If a group I, II of living spaces comprises one or more wet rooms, such as a bathroom 29 as included in the second group II in the embodiment shown, it is preferable that the wet room 29 comprises an inlet end 23 of the outlet duct 21, 21A, such that air with a relatively high humidity generated in such wet room, for example when showering or taking a bath, or for example washing or drying washing, can be removed directly through the outlet duct 21, 21A, without passing through other living spaces. In embodiments the first and second heat exchanging units 17, 17A can be provided in different outside walls 6, 7 or at least well spaced apart, such that air expelled from one of said heat exchanger units 17, 17A does not substantially influence air taken in through the other of the heat exchanger units 17, 17A.

Figure 3:
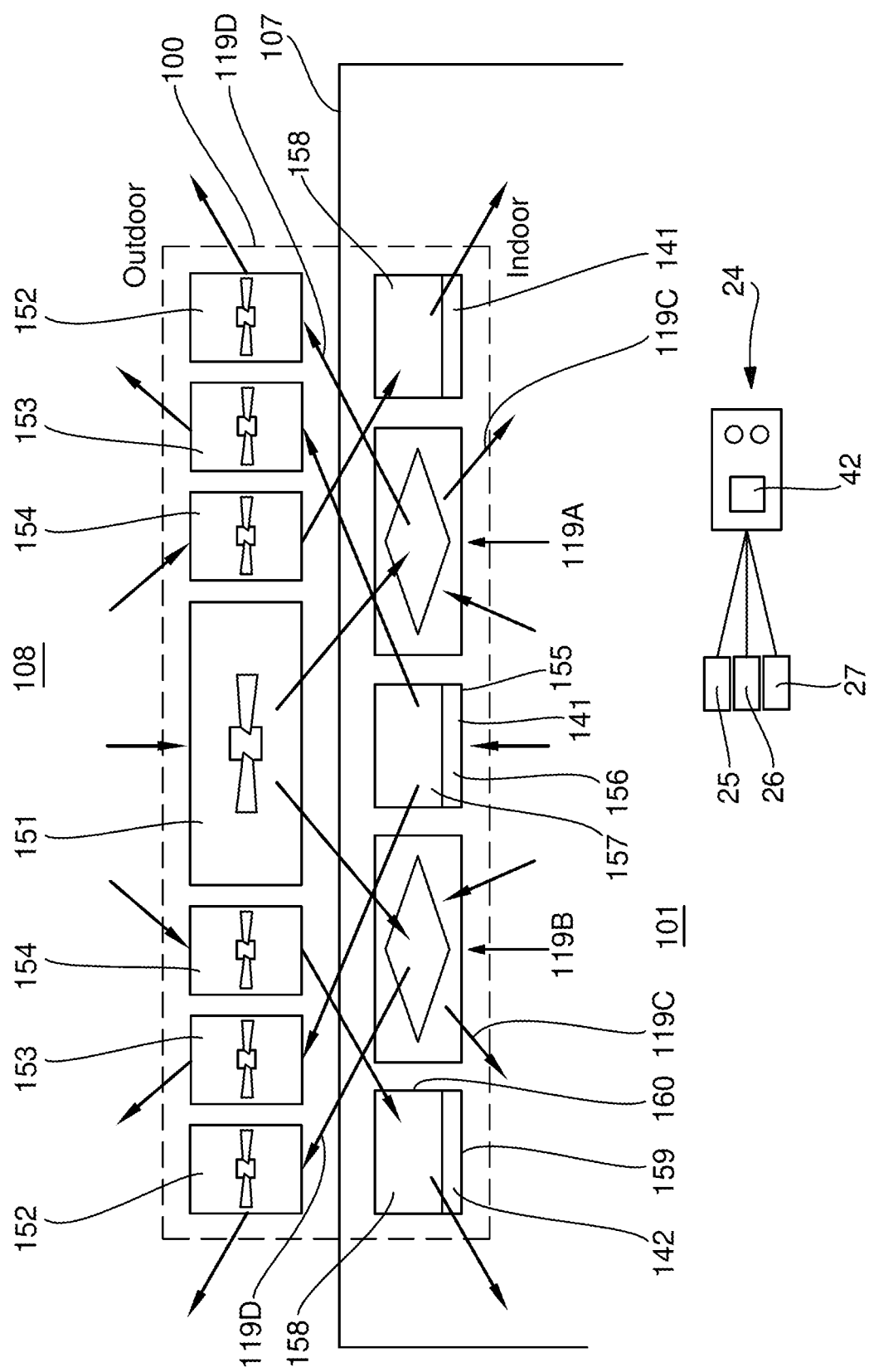
FIG. 3 a floor plan of part of a class room according to the disclosure, as a building or part of a building.

Control of a heat exchanger unit 17, 17A or a forwarding unit F, especially a ventilator 18, 18A, or, 151-154 in FIG. 3, by a control unit 60 of the or each sensor unit 24, 24A should be understood as control such that a volume of air forwarded through the relevant unit 17, 17A, F, 100 is controlled based on data received from the relevant control unit or units 60. Control in this sense can for example comprise adjustment of rotational speed of a ventilator 18, 18A, 151-154, adjustment of flow resistance of a heat exchanger unit 17, 17A, 100, or forwarding unit F, for example by control of a valve 39 in such heat exchanger unit 17, 17A, a valve 41 in a forwarding unit F and/or a valve 40 in a flow duct 21, 21A, 36. A valve 39, 40, 41 can be any suitable type of valve, such as for example but not limited to a shutter valve, a lamella valve, a diaphragm valve or the like, with which flow can be regulated and/or flow resistance through a heat exchanger or heat exchanger unit 17 or through a forwarding unit F can be regulated. In this disclosure a ventilator can be any suitable type of fan, for example an axial or redial fan.

In the present disclosure preferably in at least one and more preferably in multiple, such as all, sensor units 24, 24A and/or control units 60 an upper limit can be set for a $CO_2$ level and/or an upper and a lower limit can be or can have been set for humidity and/or noise, for at least one and preferably several, such as all the living spaces such as for living rooms, studies, dens and bedrooms and/or wet rooms, such as bathrooms, showers and toilets.

In embodiments upper and/or lower limits can be preset. In embodiments the or each sensor unit 24 can comprise an interface 42 for setting at least one of the upper and lower limits by a user, for example at least one of an upper limit and a lower limit for at least one of $CO_2$ levels, humidity and noise. In embodiments an interface 42 can for example comprise a screen, such as a touch screen and/or buttons on the sensor unit 24 and/or on a remote control, which can for example include an app on a mobile device such as a phone or tablet computer. In embodiments a single remote control can be used for control of all units 24.

In this disclosure preferably an upper limit can be or can have been set for $CO_2$ levels at less than about 1000 ppmV, for example between 350 and 1000 ppmV. In the present disclosure preferably an upper limit and a lower limit are or can be set for relative humidity for at least some living spaces, such as living rooms, studies, dens and bedrooms, which may for example be about 30% as a lower limit and 70% as an upper limit, preferably about 50% and 60%, whereas for wet rooms, such as bathrooms, showers and toilets at least an upper limit may be set higher, for example at about 90% or even higher.

As discussed, in embodiments a heat exchanger unit 17, 117 can comprise one or more bypasses 77 for air to be allowed into and/or out of the living space or class room or office space, without passing through the heat exchanger 19, 119. Such bypass 77 can be provided with a valve 41 for opening and closing said bypass 77, for example controlled by the sensor unit 24.

FIG. 3 schematically shows part of a class room 101, having an exchanging unit 100 mounted to an outside facing side of an outside wall 107, such that air can be introduced into the class room 101 from the outside space 108 and air can be expelled from the class room 101 to the outside space 108 through the exchanging unit 100.

In an exchanging unit 100 a series of heat exchangers 119 can be provided. In the embodiment shown two such heat exchangers 119 are shown. The exchanging unit 100, which can also be referred to as heat exchanging unit 100, is provided at the outer wall 107, wherein at least one ventilator 151 is provided for initiating an air flow through the heat exchangers 119, from an outside 108 of the outside wall 107 into the class room or office space 101 and/or at least one ventilator 152 for initiating an air flow through the heat exchangers 119, from the class room or office space 101 to an outside 108 of the outside wall 107.

In the embodiment shown at least one first ventilator 151 is provided for initiating the air flow through the heat exchangers 119, from an outside 108 of the outside wall 107 into the class room or office space 101 and at least one second ventilator 152 for initiating said air flow through the heat exchangers 119, from the class room or office space 101 to an outside 108 of the outside wall 107. Moreover a further, at least one third ventilator 153 is provided for initiating an air flow from the class room or office space 101 passed the heat exchangers 119 to outside the outer wall 107. Furthermore at least one further, fourth ventilator 154 is provided for initiating an air flow from outside 108 the outer wall 107 into the class room or office space 101 passed the heat exchangers 119. The third and fourth ventilators effectively provide for bypasses 77.

The exchanging unit 100 as shown in FIG. 3, by way of example, comprises a first ventilator 151 positioned between two fourth ventilators 154, flanked by two third ventilators 153, which are flanked by two second ventilators 152. In this embodiment all of the ventilators 151-154 are positioned outside the class room or office space 101, preferably at least substantially outside the outer wall 107. They can be contained in a single housing or separate housings.

The first ventilator 151 is in fluid communication with an inlet channel or series of inlet channels 119C of both heat exchangers 119, which channels 119C open into the class room or office space 101. In the class room or office space 101 an outlet box 155 is provided, here shown between the two heat exchangers 119. The outlet box 155 has an inlet 156 side facing the class room or office space 101 and an outlet side 157 connected to the third fans 153. Moreover inside the class room two inlet boxes 158 are provided, one on either side of the heat exchangers 119, which each have an outlet side 159 opening into the class room or office space 101 and an inlet side 160 connected to the fourth ventilators 154. The heat exchangers 119 furthermore have one or more outlet channels 119D which are connected to the second ventilators 152.

In the class room or office space again at least one sensor unit 24 is provided, provided with or connected to at least one and preferably all of a $CO_2$ sensor 25, a humidity sensor 26 and a noise sensor 27. The sensor unit 24 or at least the control unit 60 thereof is connected to the exchange unit 100, especially to at least the first to fourth ventilators 151-154. Hence the sensor unit can control the ventilators 151-154 and, if provided for, valves 141, for example valves in the or each inlet box 158 and/or the or each outlet box 155 and/or for the or each heat exchanger 119. Thus flow of air can be controlled by controlling the ventilators 151-154 and/or the valves 141, based on assessment of air quality in the class room or office space 101, using the sensors 25 and 26, and optionally noise, measured with the sensor 27.

By way of example, with an exchange system 100 as disclosed, outside air can be fed into the class room using the first ventilator 151, through the heat exchangers 119, in which heat can be exchanged with relatively warm air flowing out from the class room or office space through the heat exchangers 119 and the second ventilators 152. Thus air flowing in can be heated by air going out. Additionally or alternatively outside air can be introduced into the class room or office space 101 without passing through the heat exchangers 119 by flow through the fourth ventilators 154 and the inlet boxes 158, and/or air can flow out of the class room or office space 101 without passing through the heat exchangers 119 by flow through the outlet box 155 and the third ventilators 153.

Outside air will normally have a lower $CO_2$ level than occupied living spaces of class rooms or office spaces. This means that by bringing in outside air into such space the $CO_2$ level inside the space may be reduced. Moreover, cold air will contain less moisture at the same relative humidity than warmer air. Thus by bringing in relatively cold air into a space it will reduce relative humidity in said space. By combining air flow into the space through the heat exchanger(s) with air flow into the space passed the heat exchanger(s) and/or combining air flow out of the space through the heat exchanger(s) with air flow out passed the heat exchanger(s) and/or controlling the flow rates for each of these air flows, both $CO_2$ levels and humidity, especially relative humidity in said space can be controlled, thus controlling air quality in the space.

The noise generated by a system according to the disclosure will largely be dependent on the ventilators used, both in heat exchanger units and in forwarding units, their rotational speed and the flow resistance of the heat exchanger. Hence it is advantageous that the ventilators used for the heat exchanger units 17, 17A, 117, 100 are positioned outside the relevant building, for example at an outside facing side of the outer wall 7, 107 and the heat exchanger(s) 19, 119.

Figure 4:
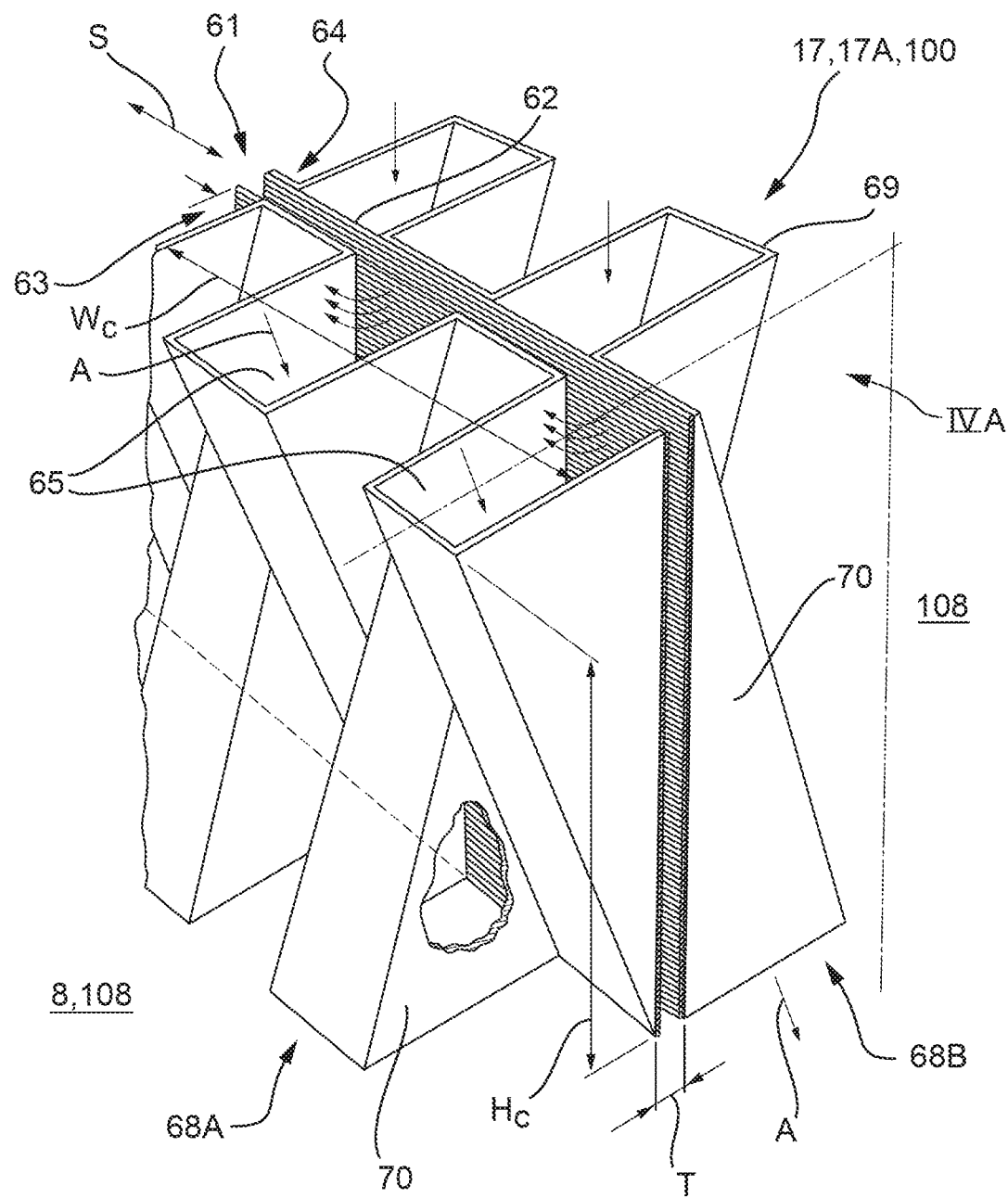
FIGS. 4 and 4A a heat exchanging unit according to the disclosure.
Figure 4A:
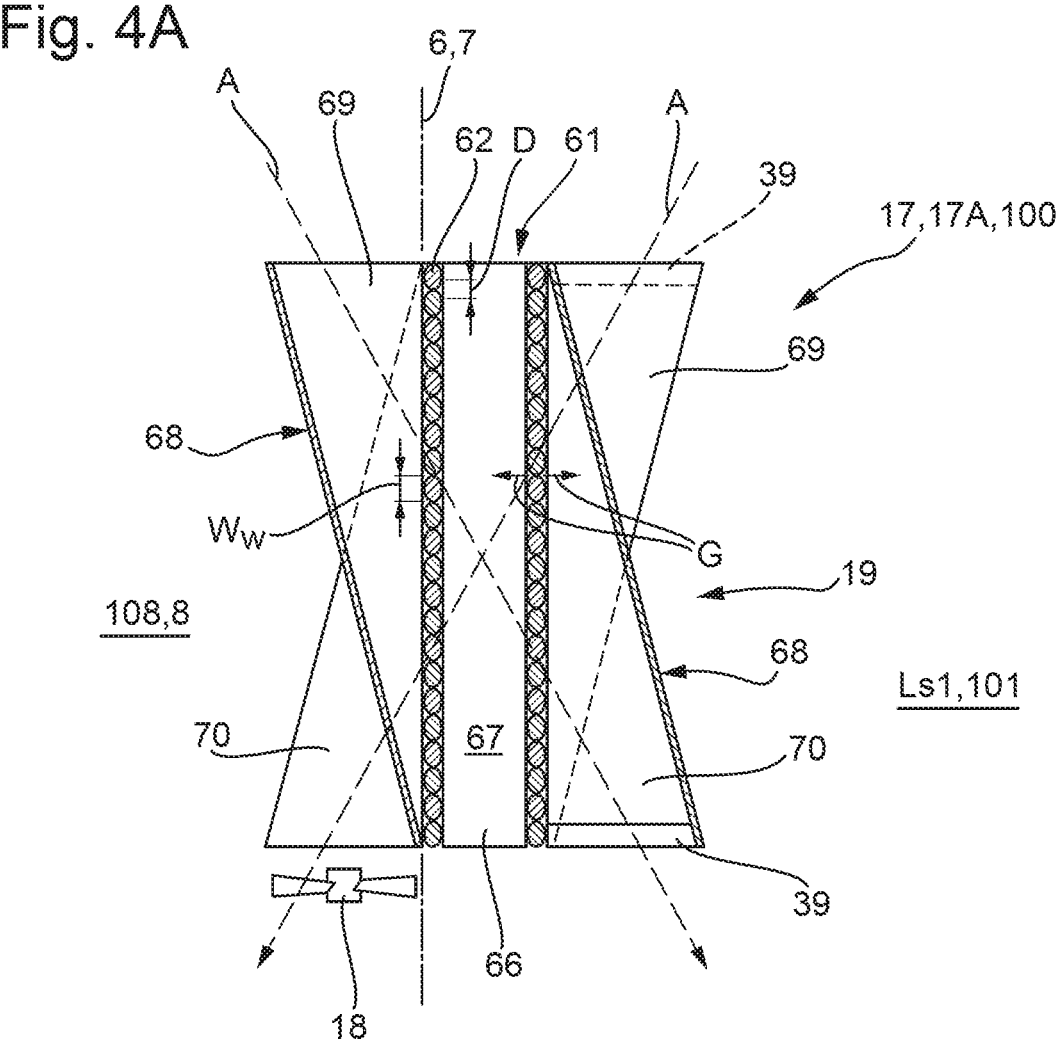

Moreover, it is preferred that low resistance heat exchangers are used. In this disclosure low resistance heat exchanger should be understood as at least meaning a heat exchanger having a relatively low resistance to air flow through the heat exchanger. Preferably such that air flow resistance can be controlled, for example from close to almost no resistance to higher resistance by using one or more valves. FIGS. 4 and 4A disclose a type of heat exchanger highly suitable for application in a system and method of the present disclosure. FIG. 4 shows part of a perspective view, whereas FIG. 4A shows a cross sectional view in a plane IVA-IVA as shown in FIG. 4. Such heat exchanger 19, 119 comprises a core 61 and wire 62 wound around said core, the wire being heat conductive. The wire preferably is metal wire, more preferably copper based wire. In FIG. 4 the core 61 is substantially rectangular and hollow, having a height Hc and width Wc which are significantly larger than a thickness T perpendicular thereto. On opposite sides 63, 64 of the core 61 parallel strands of said wire 62 form a substantially rectangular surface 65 with a limited distance D between adjacent wires, forming gaps G between wires. The distance D can for example be between 0.5 and 4 times the wire width Ww measured parallel to the said surface 65, which width Ww for generally round cross sectioned wire will be equal to the wire diameter. Said distance D preferably is between 1.5 and 2.5 times said diameter c.q. width Ww. Between opposite sides 63, 64 of the core 61, extending in a direction enclosing an angle with a main direction S of the wires at said surfaces 65, for example perpendicular to them dividing walls 66 are provided, enclosing channels 67 between them. On either side of the core 61 a channel box 68A, B is provided connecting to the wire surfaces 65. Each channel box 68 comprises alternatingly an inlet channel 69 and an outlet channel 70, wherein the boxes 68A, B are positioned such that opposite an inlet channel 69 of a first of the boxes 68A an outlet channel 70 of the other of the boxes 68B is provided and vice versa.

As can be seen in FIGS. 4 and 4A, outside air A can flow into the inlet channels 69 of the first box 68A at an outward facing side of the heat exchanger unit 17, 117, and can then pass through the gaps between the wires and through the channels 67 into the outlet channels 70 of the second box 68B at the inward facing side of the heat exchanger unit 17, 117, i.e. the side facing the relevant living space, class room or office space. Similarly but in opposite directions air can flow from the space into the inlet channels 69 of the second box 68B, through the gaps between the wires and the channels 67 in the core 61 and through the outlet channels 70 of the first box 68A into the outer space 8, 108. When passing through the gaps G between the wires 61 heat will be conducted from the air flowing out (assuming the air inside the space is warmer than the outside air) to the wires and will be transferred to the air flowing inward. Wires should be understood as including strips such as for example but not limited to strips having a substantially oval or rectangular cross section. Valves 39 can be provided for adjusting flow resistance through one or more of the inlet and/or outlet channels 69, 70.

Such heat exchanger is known from for example U.S. Pat. No. 5,832,992.

An advantage of an air to air heat exchanger as for example shown in FIGS. 4 and 4A, such as but not limited to using wires 61 for heat transfer, is that such heat exchanger can have a relatively low flow resistance with relatively high heat transfer capacity. Moreover such heat exchanger can maintain operable at low temperatures, even below zero degrees Celsius (0° C.) outside air temperature. Furthermore such heat exchanger is durable, and requires very little to no maintenance, other than occasional cleaning.

In a heat exchanger according to the disclosure one or more valves 39 can be provided in an exchange unit 17, 117, 100, for adjusting flow capacity through the unit and/or for diverting and/or distributing air flow through different channels, for example 69, 70 and/or 77 and parts of such units 17, 117, 100, for example distributing air flow over heat exchanger(s) 19, 119 and a bypass(es) 77.

As discussed, when living spaces such as a living room or class room is relatively noisy due to for example human activity in such space, a relatively high noise level resulting from the heat exchanger unit or units, and especially of (a) ventilator(s) may be acceptable, whereas when the space is relatively quit, preferably the noise level due to heat exchanger unit(s) and/or ventilator(s) is preferably kept to a minimum. In such instances it may temporarily be acceptable to allow for example $CO_2$ levels to rise, for example above 1200 PPM in a class room, for example by reducing air inflow and/or outflow. Alternatively or additionally air may be allowed to pass into the space through one or more bypasses 77.

Figure 5:
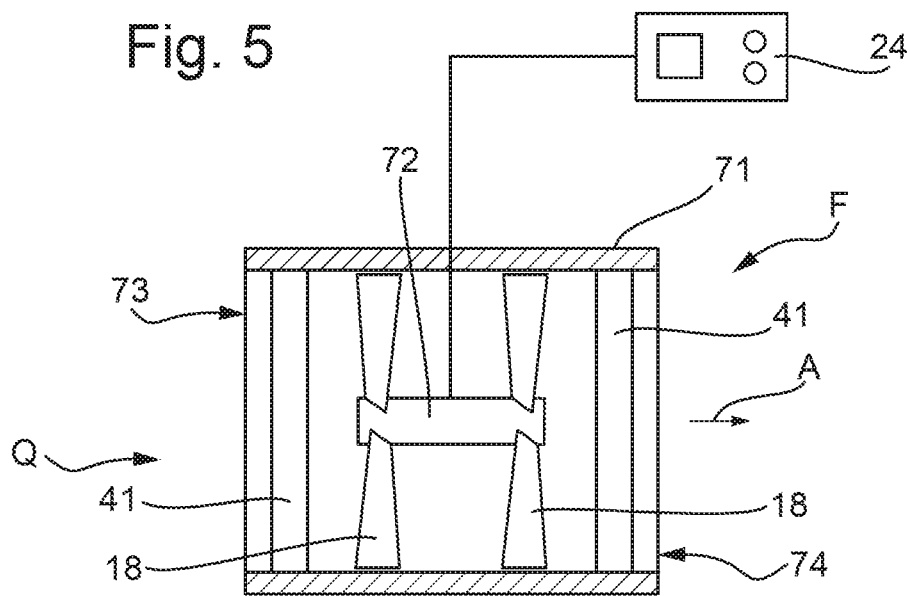
FIG. 5 a forwarding unit according to the disclosure.

FIG. 5 shows in cross section schematically a forwarding unit F in an advantageous embodiment, for positioning in a separating wall and/or in an outlet duct. In this embodiment the forwarding unit F comprises a tubular housing 71, for example having a substantially circular cross section. Within the housing 71 at least one ventilator or fan 18 is provided, drivable by a motor 72, for forcing air from one end 73 of the housing 71 to the opposite end 74. In the embodiment shown two ventilators or fans 18 are provided, each drivable by a motor 72. They can either both have a separate motor 72 or a combined motor and a gearing (not shown). In an embodiment the ventilators or fans 18 can have opposite driving directions, but the same direction Q of forwarding the air. It has been found surprisingly that such combined ventilators or fans can provide for significantly less noise when forwarding a volume of air from one end 73 of the housing 71 to the opposite end 74 per time unit than a single ventilator in a similar housing forwarding the same volume of air per unit of time. As is shown in FIG. 5 at one end 73, 74 or both ends 73, 74 of the housing a valve 41 can be provided in the housing, for further regulating flow, adjustment of flow resistance and/or for closing at least partly the housing when no flow of air is required through the housing 71.

As can be seen in FIG. 5 the forwarding unit F can be connected to a sensor unit 24, 24A as discussed before, for control of the ventilator(s) and/or valve(s) of the forwarding unit F.

Figure 6:
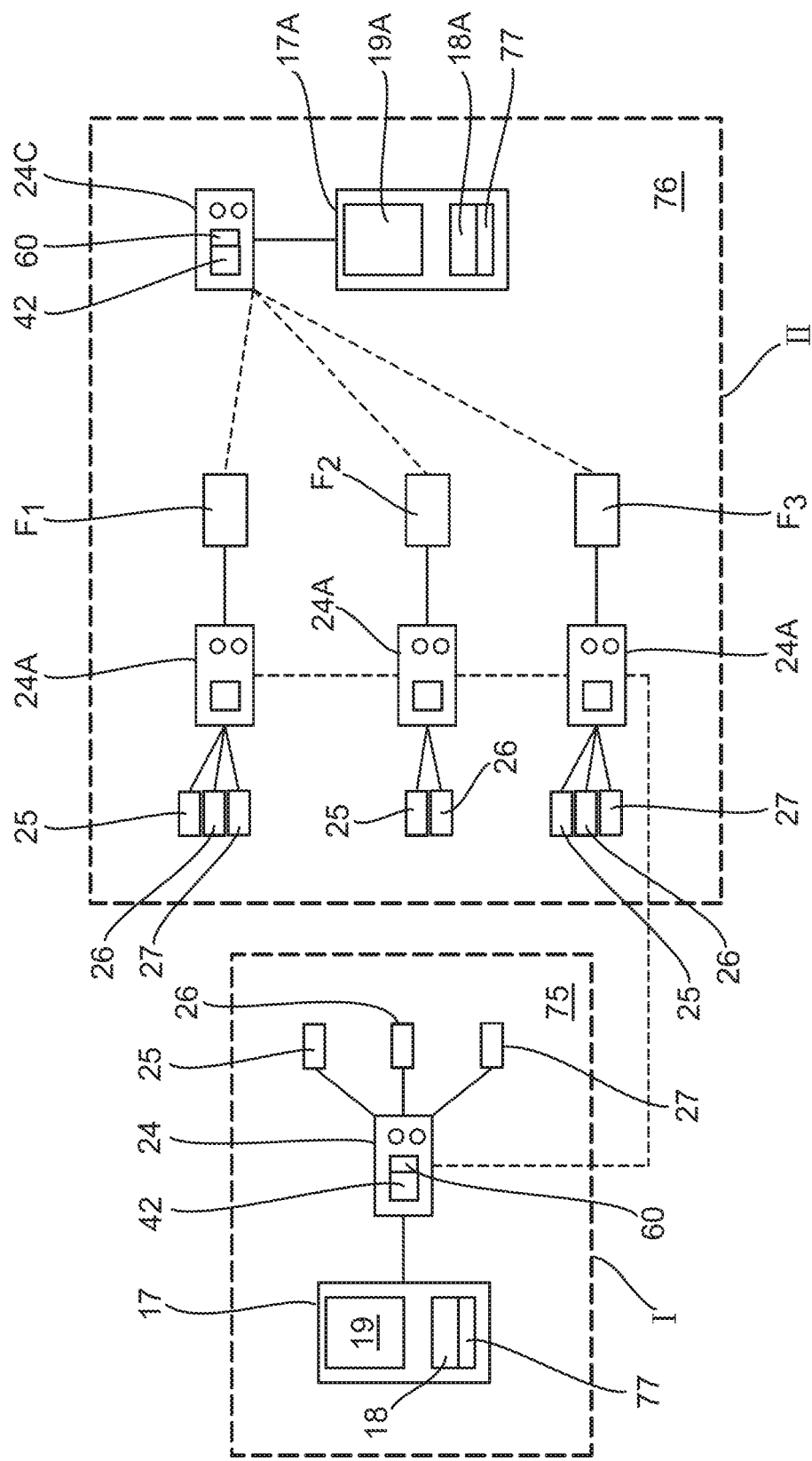
FIG. 6 a diagram of a system according to the disclosure.

FIG. 6 shows schematically a diagram of a system of the present disclosure. As can be seen the system in this embodiment comprises a first part 75 for a first living space or group I of living spaces, and a second part 76 for a second living space or group II of living spaces, for example as discussed in relation to FIGS. 1 and 2 here before. In this embodiment the first part 75 comprises a first heat exchanger unit 17 with a heat exchanger 19 and a ventilator 18, connected to a first sensor unit 24 with a control unit 60 and $CO_2$, humidity and noise sensors 25, 26 and 27. The second part 76 comprises the second heat exchanger unit 17A, again comprising a heat exchanger 19A and a ventilator 18A. In the second part moreover in this embodiment three sensor units 24A are provided, and three forwarding units F, but it shall be clear that any number of such forwarding units F can be provided, and any suitable number of sensor units 24A with sensors 25, 26 and/or 27 connected to them. In this embodiment the second heat exchanger unit 17A is connected to a further sensor unit 24C. As shown by dotted lines one or more of the sensor units 24, 24A can be combined or can be connected to each other for centralized control of heat exchanger units 17, 17A and/or forwarding units F, within each of the parts 75, 76 and/or between said parts 75, 76.

Referring also to FIG. 1-8, with the first part 75 air quality can for example be controlled in a first living space Ls1 as follows. Air quality inside the living space Ls1 is measured, based on $CO_2$ level data and relative humidity (RH) of the air. As discussed an upper limit may be set for both $CO_2$ levels and relative humidity. If either one of the upper limits is approached, as sensed by the relevant sensor 25, 26, the sensor unit 24, and especially the control unit 60 thereof can allow air, or more air to flow into the living space Ls1 through the heat exchanger 17 and/or, if applicable, through the bypass 77. Since outside air will commonly have a lower level of $CO_2$ than air in a living space and will be colder, bringing outside air into the living space Ls1 will bring both the $CO_2$ level and the relative humidity level down. In general the larger the difference in temperature between outside air and air in the living space, the larger the effect of introducing outside air will have on especially relative humidity. Hence bypassing of the heat exchanger of part or all of the outside air brought into the living space may be beneficial.

With the noise sensor 27 the noise level in a living space, for example living space Ls1 or one or more of the bedrooms B1, B2, B3 or a class room or office space 101 can be monitored. Especially noise levels resulting from for example activity in a living space such as for example talking by people, television noise, music and the like, or the relative absence thereof. Based on the noise level assessed, the system can be controlled. Especially one or more of the ventilators 18, 118, 151-154 can be controlled and/or flow resistance over the heat exchanger unit 17, 117 can be adjusted. Thus noise generated by the heat exchanger unit 17, 117 and especially the ventilator(s) 18, 118, 151-153 can be adjusted. For example again a maximum level can be set in the sensor unit 24. If the maximum noise level in a living space such as for example Ls1, B, 101 is reached but the air flow into the living space is insufficient for suitable control of the air quality, for example for control within the limits set in the sensor unit 24 for $CO_2$ level and/or humidity, the flow resistance of the heat exchanger unit 17, 117, 100 may be adjusted, especially lowered, such that the air flow into the living space can be increased without increasing the noise level further as generated by especially the ventilator(s) 18, 151-154. The flow resistance can for example be altered by opening one or more valves 39, 40 and/or 41 in the heat exchanger unit(s) 17, 117, 100 and/or by allowing at least part of the air flow to bypass the heat exchanger(s) into the living space. It has been found that reducing the flow resistance may reduce efficiency of heat transfer in the heat exchangers but this will generally be compensated for by heat generated by the people in the living space. Whereas when there are fewer or no people in the living space the flow resistance can be increased again, increasing efficiency, since less air flow will be necessary and hence the noise level can easily be maintained below the maximum level set.

More generally, by using a noise sensor 27 in a living space the noise generated by the heat exchanger unit(s) 17, 117, 100 and/or forwarding unit(s) F, especially the ventilators 18, 118, 51-54 thereof, relevant for the living space can be adapted based on the noise level in said living space. The more noise is registered inside the living space, the higher the noise level generated by the units 17, 117, 100 will be acceptable. For example if little or no noise is registered inside the living space, for example due to the absence of people or when people are sleeping or studying or the like in a living space, the ventilators 18, 118, 151-154 may be reduced in speed and hence reducing noise generated by them, whereas if a lot of noise is registered, for example by many people in a living space, higher noise levels of the ventilators is acceptable and hence the rotational speed of the ventilators may be increased and/or flow resistance may be lowered. Obviously for different living spaces different maximum noise levels could be set, whereas the maximum noise level set can vary in time, for example higher during day time or school or office hours and lower during night time or non-school or non-office hours.

Figure 7:
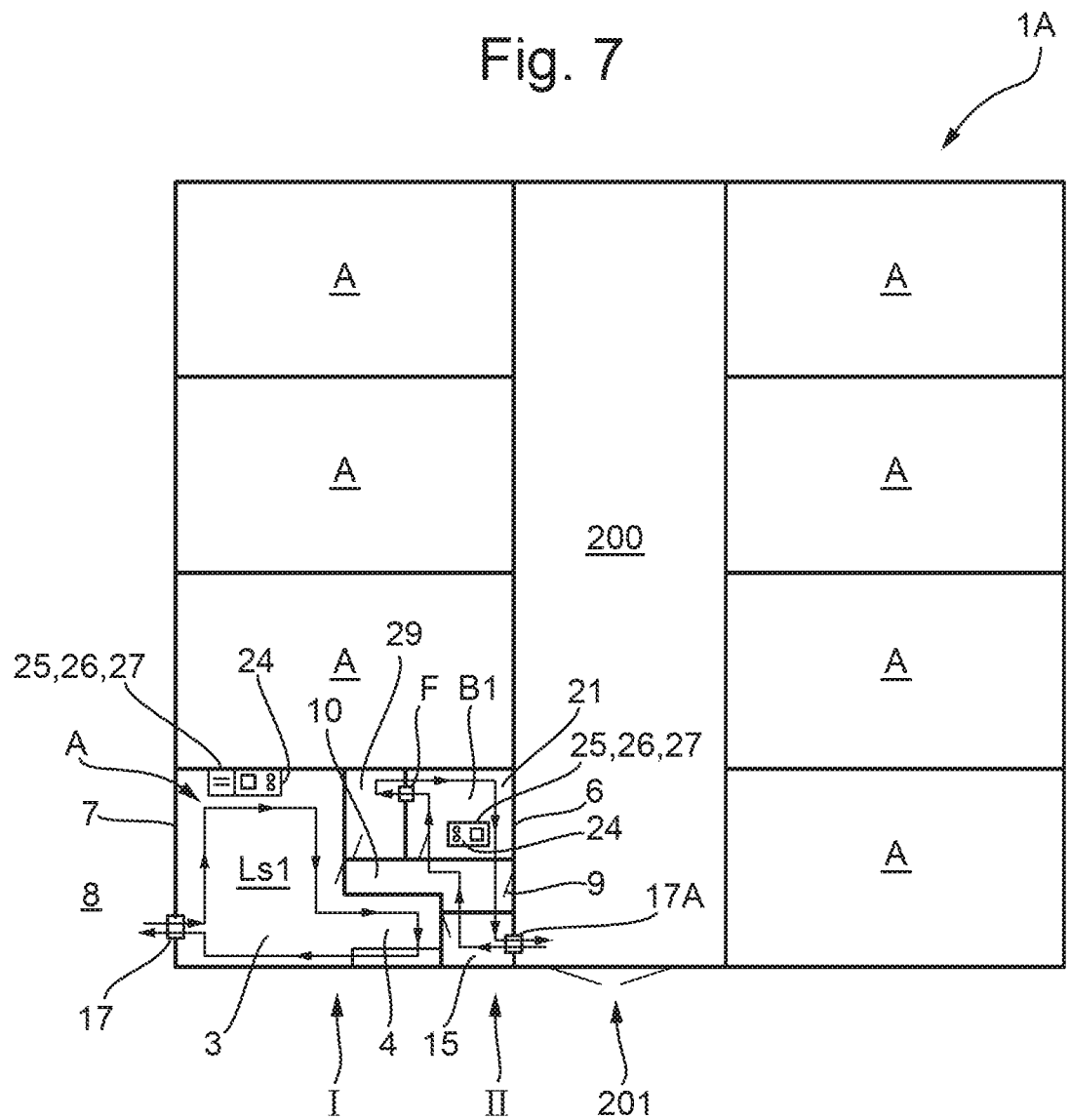
FIG. 7 a floor plan of part of an apartment building.

FIG. 7 schematically shows part of a floor plan of an apartment building 1A, comprising a series of apartments A. In FIG. 7 only for the apartment in the lower left hand corner living spaces have been shown. The other apartments can have the same or similar interiors. The said apartment A has a first living space Ls1 similar to that of FIG. 1, comprising a living room 3 and a kitchen area 4. This is the first group or area I, for example controlled by a first part 75 of the system as disclosed in FIG. 6. Furthermore a second group II is shown, comprising a hall 10 with a front door 9, a toilet space 15, a bedroom B1 and a bathroom 29. The front door 9 opens into an atrium 200, common to all apartments A. A central entrance 201 to the atrium 200 is provided. The first living space Ls1 has a first heat exchanger 17 in the rear wall 7, opening into an outside space 8, similar to FIG. 1. Air can be circulated through the living space, controlled by a first sensor unit 24 with $CO_2$ and humidity sensors 25, 26 and optionally noise sensor 27. The second group II has a second heat exchanger unit 17A in a front wall 6, opening into the atrium 200. A forwarding unit F is provided between the bedroom B1 and the bathroom 29, such that air can be circulated through the second group II of living spaces, from the atrium as outside space through heat exchanger 17B, the toilet space 15 and the hall 10 into the bedroom B1. From the bedroom B1 it can flow into the bathroom 29, through the forwarding unit F. From the bathroom 29 the air can then be returned to the heat exchanger unit 17A through an appropriate outlet duct 21. Again the air flow through the second group II can be controlled, for example by a second part 76 of a system as disclosed in FIG. 6, using one or more sensor units 24A, C as discussed in relation to e.g. FIGS. 1, 2 and 3.

With a system according to the disclosure a method for air quality control can be performed, in which for example air quality in a first living space or group of spaces I can be controlled substantially independent of air quality controlled in a second or further group II of living spaces. For two living spaces Ls1 and Ls2 in a group or series, such as the second group II, as for example shown in FIG. 8, having a common separating wall 33 with a forwarding unit F1 air can be extracted from a first of the living spaces Ls1 into a second of the two living spaces Ls2. The air retracted from said first living space Ls1 can be replenished, either from an outside space 8 or atrium 200, or from a further living space Ls3 connected to the said first living space Ls1, preferably through a further forwarding unit F2.

In a first modus of operation of a system of the disclosure air may be entered into the second living space Ls2 in the series, based on a signal from a sensor unit 24(2) in the said second living space Ls2 in the series, for example because the $CO_2$ level and/or the humidity level in the second living space Ls2 is reaching a predetermined level. This will initiate or increase air flow through the relevant forwarding unit F1 in said separating wall 33 between the first and second living space Ls1, Ls2. In order to replenish the air removed from the first living space Ls1 to the second Ls2, outside air will be introduced into the first living space Ls1 through the heat exchanger unit 17, which may be controlled by the first sensor unit 24(1) in the first living space Ls1. At the same time air will be removed from the second living space Ls2, for example into a third living space Ls3 through a second forwarding unit F2 and/or through an outlet duct 21, which may again be controlled by a third sensor unit 24(3). Similarly air flow through the living spaces in a series can be initiated by assessment of air quality in any one of the living spaces in the series.

In a second modus of operation of a system of the disclosure air may be entered into the first living space Ls1, based on a signal from a sensor unit 24(1) in the said first living space Ls1 in the series, for example because the $CO_2$ level and/or humidity level in the first living space Ls1 is reaching a predetermined level, for example a preset maximum level. This will initiate or increase air flow from the outside space or atrium through the relevant heat exchanger unit 17 and/or a bypass 77 into the first living space Ls1, controlled by the first sensor unit 24(1). At substantially the same time air has to be removed from the first living space Ls1, for example to a second Ls2 and/or further living space Ls4, connected to the first living space Ls1 through a first forwarding unit F1 or a further forwarding unit F3, and/or through an outlet duct 21. If the air is removed from the first living space Ls1 into a further living space Ls2, Ls4, at the same time air will be removed from the said living space Ls2, Ls4, for example into a third living space Ls3 through a second forwarding unit F2 and/or through an outlet duct 21. In such embodiment the forwarding unit(s) F involved in removing air from the first living space Ls1 may at least partly be controlled by the first sensor unit 24(1), and/or for example by a pressure sensor sensing increase of air pressure inside the first living space Ls1.

Figure 9:
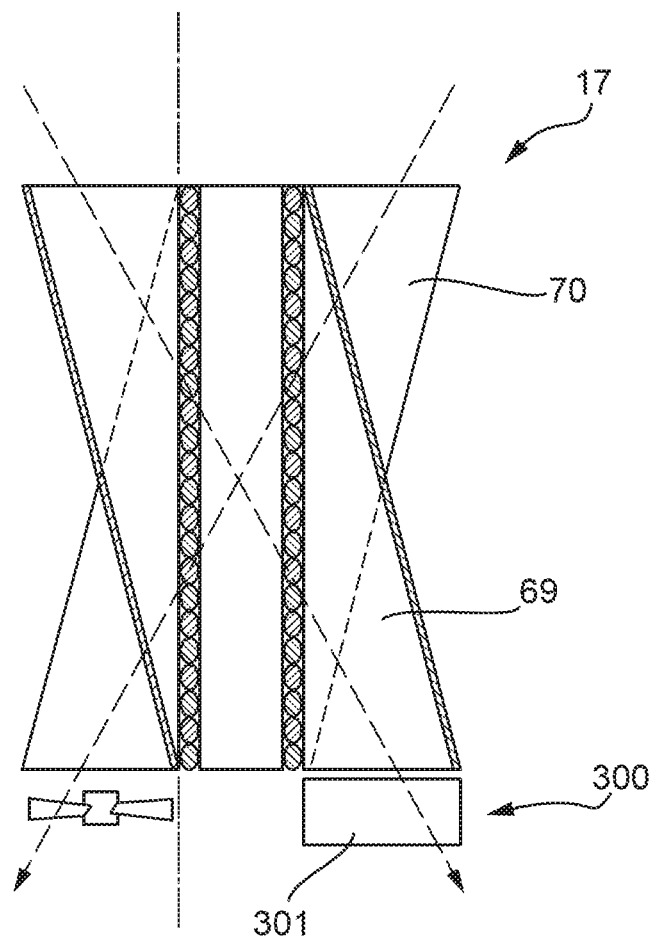
FIG. 9 schematically an embodiment of a heat exchanger with a filter unit.
Figure 10:
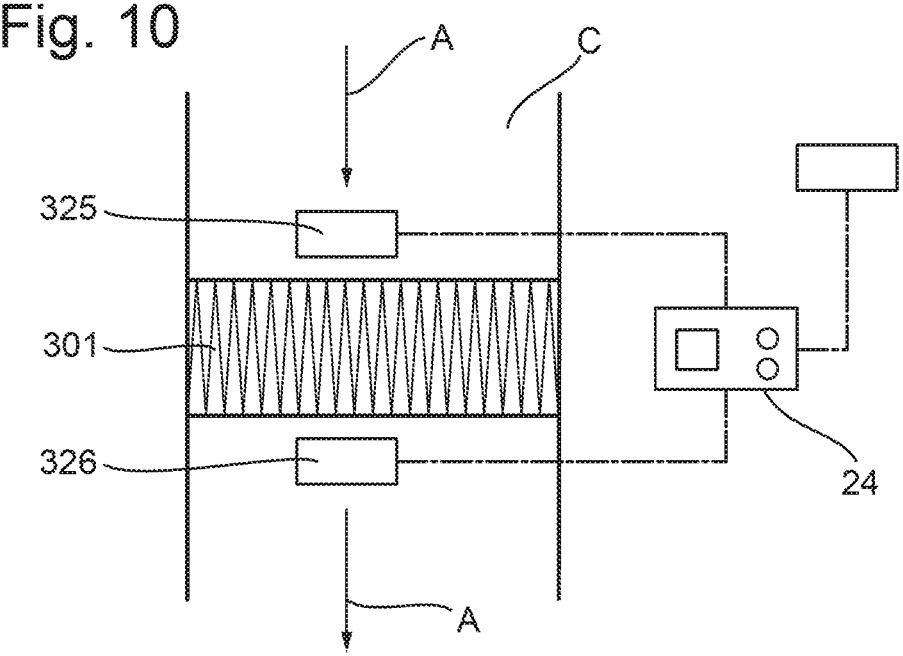
FIG. 10 schematically an embodiment of a filter unit, especially suitable for use in a system of the disclosure.

FIGS. 9 and 10 disclose filter units 300 which can be used in the present disclosure, for example but not necessarily in combination with some or all of the embodiments of heat exchanger units 17 and/or sensors 25 and sensor units 24 disclosed.

FIG. 9 shows a heat exchanger unit 17, for example as also shown in FIGS. 4 and 4A, as can be used in all embodiments disclosed, in which a small particle filter 301 is provided in or at an end of a channel 69, 70, for filtering small particles out of the air A flowing into a living space, for example upon entrance into or exiting from a heat exchanger unit 17. Hence the filter 301 is preferably provided in the inlet channel 69. The small particle filter 301 can for example be a filter according to ISO16890, for example a class F8 filter. The filter 301 can for example be a filter filtering out at least about 60% of particles smaller than 10 μm, preferably filtering out at least about 60% of particles up to 2.5 μm.

In embodiments the heat exchanger unit 17 can be a wire based heat exchanger unit as described earlier, designed such that for example 60% or more of particles smaller than 10 μm, and/or at least about 60% of particles up to 2.5 μm is filtered out by the heat exchanger unit 17 itself. The relevant part of the heat exchanger unit 17 comprising the wires filtering the particles can then be designed such that it can easily be cleaned, for example in a dishwasher. The filter 301 can then for example be a filter filtering out at least about 70% or particles up to 0.4 µm. This can be an ePM1-70% filter, for example a class F8 filter according to ISO16890. The filter 301 can preferably be removed for cleaning or replacement. A similar filter unit 301 could be provided in a bypass 77 or a forwarding unit F as discussed.

FIG. 10 shows an embodiment of part of a heat exchanger 17 or bypass 77 or forwarding unit F, comprising a filter 301 as well as a sensor unit $25_4$ for sensing small particles in an air flow A passing through the relevant channel C (here in general referred to as channel C, which can be any relevant channel of a heat exchanger, forwarding unit or bypass). The sensor unit 254 can comprise a first small particle sensor 325 and a second small particle sensor 326, both coupled to e.g. a control unit or sensor unit 24, 24A, measuring small particle content upstream and downstream of the filter 301. Comparing the values measured upstream and downstream of the filter 301 can provide a user information of whether a filter 301 is still effective enough in filtering out the relevant particles or needs replacing or cleaning. Such information can be shown to the user, for example by indicator lights, by a warning signal or on a screen of the unit 24 or in any other suitable way. Small particle sensors 325, 326 suitable for use in the present disclosure are as such well known in the art, and can for example be optical sensors. Such sensors can for example be laser based optical sensors, such as but not limited to sensors provided by Plantower, China, for example the PMS7003 or PMS5003. If preferred a small ventilator could be added to one or both of the sensors 325, 326.

In general a system according to the present disclosure allows for providing for optimized ventilation with relatively few ducts, which reduces the necessity of cleaning and reduces the risk of for example contamination by fungus, bacteria and the like. Air can be introduced relatively easy into living spaces, with little noise. The air can moreover be controlled easily in quality and different levels, providing for optimization of living quality. Comfort in a building provided with a system according to the disclosure will be energy efficient, comfortable and healthy. The system allows for substantially autonomous adaptation of the level of ventilation, depending on for example air quality sensed in different living spaces in a building. When for example indoor noise levels are low and/or outdoor levels of fine particle content is high, the air flow into a building may automatically be controlled, especially reduced, controlling the indoor living quality. For example by at least temporarily preventing an excess of small particles to enter into the building.

Obviously a system according to the disclosure can be designed to operate in either modus as discussed, or both.

Figure 8:
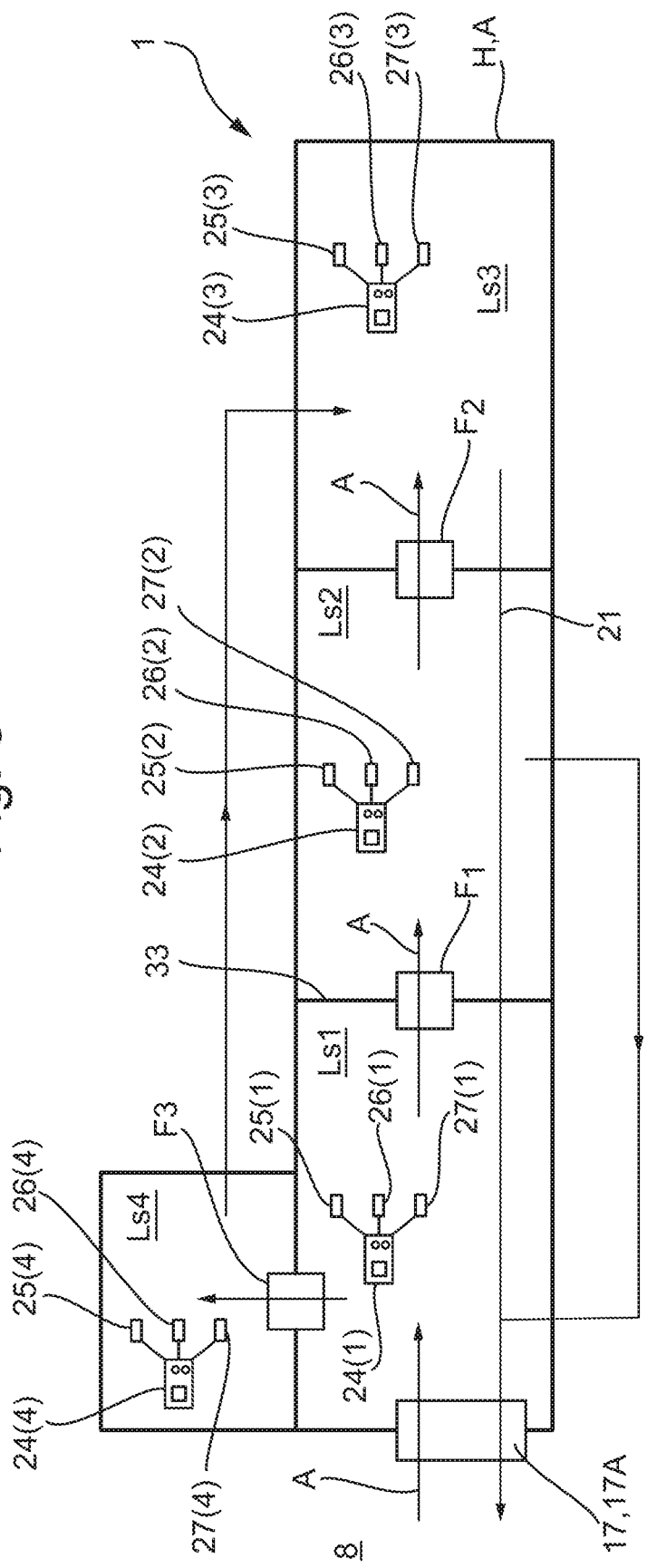
FIG. 8 schematically a series of living spaces using a system according to the disclosure.

In the present disclosure different embodiments of a building, system and method have been disclosed and discussed, by way of example only. Many different embodiments are possible with the scope of the present disclosure. For example different sensors could be added to a system of the disclosure, such as for example but not limited to a $CO_2$ gas sensor, a temperature sensor, a movement sensor and the like. Two or more sensor units 24 can be combined or interconnected, or can be coupled to sensors in multiple living spaces. Different living spaces in a series can be provided with separate heat exchanger units, for example for allowing air to be expelled from a living space either directly into the outside space or into another living space in the series of living spaces. More than two groups of living spaces can be provided in the same house or apartment. Each ventilator or ventilator unit can comprise two ventilators, similar to the forwarding unit as disclosed in FIG. 5. In a single separating wall multiple forwarding units can be provided. Living spaces, especially wet cells can be provided with a bypass duct, for example directly passing into one of the other living spaces, as indicated in FIG. 8 for example by the line between the fourth and third living spaces Ls4 and Ls3, or the line between the second living space Ls2 and the duct 21, and/or to an outside space or to a heat exchanging unit, in order to allow exchange of air in the wet room without flow of air through at least some of the other living spaces in a series. Different heat exchangers can be used in a system, building and method according to the disclosure. These and many other variations, including but not limited to all combinations of examples, features and parts of the embodiments disclosed are considered to have been disclosed herein.

The invention claimed is:

1. A building comprising at least one living space, separated from an outside space by at least one outer wall, wherein at least one heat exchanger unit with a controllable temperature set point is provided at said at least one outer wall and wherein at least one ventilator is provided for said at least one heat exchanger unit, for forcing air through a heat exchanger of the at least one heat exchanger unit, wherein an air outlet duct is connected to the at least one heat exchanger unit for allowing air to be expelled from the at least one living space through the heat exchanger, such that heat can be exchanged in the heat exchanger between air flowing into the at least one living space and air being expelled from said at least one living space, wherein in said at least one living space at least one sensor unit is provided for assessment of measured $CO_2$ levels and/or measured noise levels and the at least one ventilator and/or the at least one heat exchanger unit is controlled based on said measured $CO_2$ levels or measured noise levels by increasing the ventilator speed and lowering the temperature set point in response to increasing measured $CO_2$ levels or by increasing noise levels and decreasing the ventilator speed and raising the temperature set point in response to decreasing $CO_2$ levels or decreasing measured noise levels.

2. The building according to claim 1, wherein at least two living spaces and/or groups of living spaces are provided in said building, separated from each other by walls, floors and/or ceilings, wherein each of the two living spaces or groups of living spaces is provided with the at least one heat exchanger unit at an outer wall of the at least one outer wall and the at least one ventilator for said at the least one heat exchanger unit, wherein each of the two living spaces or groups of living spaces is provided with the at least one sensor unit for controlling the relevant heat exchanger unit and/or the at least one ventilator based on air quality and/or noise in the relevant living space or group of living spaces.

3. The building according to claim 2, wherein at least one group of living spaces is provided, comprising at least a first and a second living space, separated from each other by an internal wall, wherein in said internal wall at least one air forwarding unit is provided for allowing passing of air from the first living space to the second living space.

4. The building according to claim 3, wherein the at least one sensor unit is provided in or connected to the at least one air forwarding unit, for controlling the at least one air forwarding unit at least on the bases of air quality assessed by at least the at least one sensor unit.

5. The building according to claim 3, wherein the first living space is provided with the outside wall comprising at least the at least one heat exchanger unit and the at least one ventilator, for introducing outside air into the first living space.

6. The building according to claim 2, wherein at least one of the at least two living spaces, or at least one of the living spaces within a group of living spaces is a wet room.

7. The building according to claim 1, wherein between at least two adjacent living spaces at least one air passage is provided, separate from the at least one heat exchanger unit and the at least one ventilator.

8. The building according to claim 1, wherein the building has said first outer wall on a first side of the building, comprising said first heat exchanger connected to an outlet end of a first air outlet duct and a second outer wall on a second side of the building, comprising a second heat exchanger connected to an outlet end of a second air outlet duct, wherein inlet openings of the first and second air outlet ducts are provided in different living spaces.

9. The building according to claim 1, wherein the building is a house or an apartment.

10. The building according to claim 1, wherein fluidly connected to each heat exchanger in the outer wall is the at least one ventilator, which is provided at an outside facing area of the heat exchanger.

11. The building according to claim 1, wherein the living space is a class room or office space, wherein a series of heat exchangers is provided at the outer wall, wherein at least one ventilator is provided for initiating an air flow through the heat exchangers, from an outside of the outer wall into the class room or office space and/or at least one ventilator for initiating an air flow through the heat exchangers, from the class room or office space to an outside of the outside wall.

12. The building according to claim 1, wherein the living space is a class room or office space, wherein a series of heat exchangers is provided at the outer wall of said living space, wherein:
said at least one first ventilator is provided for initiating said air flow through the heat exchangers, from an outside of the outside wall into the class room or office space; and
at least one of:
a third ventilator for initiating an air flow from the class room or office space passed the heat exchangers to outside the outer wall; and
a fourth ventilator for initiating an air flow from outside the outer wall into the class room or office space passed the heat exchangers.

13. The building according to claim 1, wherein the at least one ventilator is provided outside the outer wall in the outside space.

14. The building according to claim 1, wherein the at least one heat exchanger comprises a core and wire wound around said core, the wire being heat conductive, metal wire, wherein the core is provided with a series of openings, and the wire is wound around the core, extending over said series of openings.

15. The building according to claim 1, wherein at least one small particle sensor unit and/or at least one small particle filter is provided in at least one heat exchanger, forwarding unit and/or bypass.

16. The building according to claim 1, wherein said at least one sensor unit in said at least one living space assesses measured noise level.

17. The building according to claim 3, wherein the at least one air forwarding unit comprises a first ventilator and/or valve in addition to the at least one ventilator and/or one valve.

18. The building according to claim 6, wherein the air outlet duct extends from said at least one wet room to the at least one heat exchanger unit in the outer wall of the living space or group of living spaces.

19. The building according to claim 1, wherein the building comprises at least two spaces, wherein the heat exchanger is provided in an outside wall of a first of said at least two spaces and a second of said at least two spaces is connected to the heat exchanger in the first of said at least two spaces by at least one air duct, for feeding air away from the second of said at least two spaces to outside the building through said heat exchanger and/or for feeding air into said second of said at least two spaces through said heat exchanger.

20. The building according to claim 19, wherein the building comprises at least three spaces, wherein at least one air duct extends through a third of said at least three spaces, between the heat exchanger in the first space and the second space or vice versa.

21. The building according to claim 1, wherein a small particle filter is provided in at least one of a heat exchanger, forwarding unit and/or by-pass, and wherein first and second small particle sensors are provided at opposite sides of the small particle filter for measuring a difference in small particle at opposite sides of the small particle filter.

22. A building comprising at least one living space, separated from an outside space by at least one outer wall, wherein at least one heat exchanger unit with a controllable temperature set point is provided at said at least one outer wall and wherein at least one ventilator is provided for said at least one heat exchanger unit, for forcing air through a heat exchanger of the at least one heat exchanger unit, wherein an air outlet duct is connected to the at least one heat exchanger unit for allowing air to be expelled from the at least one living space through the heat exchanger, such that heat can be exchanged in the heat exchanger between air flowing into the at least one living space and air being expelled from said at least one living space, wherein in said at least one living space at least one sensor unit is provided for assessment of measured $CO_2$ levels and/or measured noise levels and the at least one ventilator and/or the at least one heat exchanger unit is controlled based on said measured $CO_2$ levels or measured noise levels by increasing the ventilator speed and lowering the temperature set point in response to increasing measured $CO_2$ levels or by increasing noise levels and decreasing the ventilator speed and raising the temperature set point in response to decreasing $CO_2$ levels or decreasing measured noise levels, and wherein the at least one ventilator comprises two ventilators, which are provided having opposite directions of rotation and a same air-forwarding direction.

23. A building comprising at least one living space, separated from an outside space by at least one outer wall, wherein at least one heat exchanger unit with a controllable temperature set point is provided at said at least one outer wall and wherein at least one ventilator is provided for said at least one heat exchanger unit, for forcing air through a heat exchanger of the at least one heat exchanger unit, wherein an air outlet duct is connected to the at least one heat exchanger unit for allowing air to be expelled from the at least one living space through the heat exchanger, such that heat can be exchanged in the heat exchanger between air flowing into the at least one living space and air being expelled from said at least one living space, wherein in said at least one living space at least one sensor unit is provided for assessment of measured noise levels and the at least one ventilator and/or the at least one heat exchanger unit is/are controlled based on said measured noise levels by increasing the ventilator speed and lowering the temperature set point in response to increasing noise levels or by decreasing the ventilator speed and raising the temperature set point in response to decreasing measured noise levels.

24. The building according to claim 23, wherein in said at least one living space a second sensor unit is provided for assessment of measured $CO_2$ levels, and wherein the at least one ventilator and/or the at least one heat exchanger unit is/are controlled based on said measured $CO_2$ levels by increasing the ventilator speed and lowering the temperature set point in response to increasing measured $CO_2$ levels and decreasing the ventilator speed and raising the temperature set point in response to decreasing $CO_2$ levels.

\* \* \* \* \*